(12) United States Patent
Song et al.

(10) Patent No.: US 10,889,008 B1
(45) Date of Patent: Jan. 12, 2021

(54) AUTOMATED DISPENSING MACHINE ADOPTING LOCAL COVERAGE TYPE SUCKER ARRAY AND CONTROL METHOD THEREOF

(71) Applicant: Chongqing University, Chongqing (CN)

(72) Inventors: Yongduan Song, Chongqing (CN); Zhixi Shen, Chongqing (CN); Xiaohu Pan, Chongqing (CN); Li Chen, Chongqing (CN); Xiao Chen, Chongqing (CN); Zhilin Wang, Chongqing (CN)

(73) Assignee: Chongqing University, Chongqing (CN)

( * ) Notice: Subject to any disclaimer, the term of this patent is extended or adjusted under 35 U.S.C. 154(b) by 0 days.

(21) Appl. No.: 16/837,855

(22) Filed: Apr. 1, 2020

(30) Foreign Application Priority Data

Jul. 9, 2019  (CN) .......................... 2019 1 0615510

(51) Int. Cl.
| | |
|---|---|
| *G07F 17/00* | (2006.01) |
| *B25J 15/06* | (2006.01) |
| *B25J 5/02* | (2006.01) |
| *B25J 13/08* | (2006.01) |
| *B25J 9/16* | (2006.01) |

(52) U.S. Cl.
CPC ............. *B25J 15/0658* (2013.01); *B25J 5/02* (2013.01); *B25J 9/1612* (2013.01); *B25J 13/088* (2013.01); *B25J 15/0625* (2013.01); *G07F 17/0092* (2013.01)

(58) Field of Classification Search
None
See application file for complete search history.

(56) References Cited

U.S. PATENT DOCUMENTS

| 5,946,883 | A * | 9/1999 | Yuyama ................ G07F 11/165 53/154 |
| 7,753,229 | B2 * | 7/2010 | Hutchinson ............. G07F 11/44 221/7 |
| 7,885,725 | B2 * | 2/2011 | Dunn ........................ G07F 9/02 700/237 |
| 2003/0146233 | A1 * | 8/2003 | Chirnomas ............. G07F 11/02 221/123 |

(Continued)

*Primary Examiner* — Gene O Crawford
*Assistant Examiner* — Ayodeji T Ojofeitimi
(74) *Attorney, Agent, or Firm* — Slater Matsil, LLP

(57) ABSTRACT

The present disclosure discloses an automated dispensing machine adopting local coverage type sucker array and a control method thereof. The automated dispensing machine adopting local coverage type sucker array comprises a rack. A medicine obtaining device and a medicine weighing and discharging device are arranged on the rack. The control method comprises: (1), after receiving medicine grasping and discharging commands, a single-chip microprocessor firstly selects a current medicine obtaining station according to a medicine obtaining station circulation sequence, and then controls the first linear driver to push the slide to move forwards to the selected medicine obtaining station; (2), the single-chip microprocessor transmits the control signal to a fifth relay to control the second linear driver to drive the vacuum medicine sucking mechanical arm to move downwards.

11 Claims, 3 Drawing Sheets

(56) References Cited

U.S. PATENT DOCUMENTS

| | | | | |
|---|---|---|---|---|
| 2004/0112911 A1* | 6/2004 | Kim | ................. | B65B 5/103 |
| | | | | 221/92 |
| 2005/0224510 A1* | 10/2005 | Remis | ................. | B65B 57/20 |
| | | | | 221/69 |
| 2006/0259195 A1* | 11/2006 | Eliuk | ................. | B65B 55/16 |
| | | | | 700/245 |
| 2014/0366489 A1* | 12/2014 | Scholten | ............. | B65B 61/025 |
| | | | | 53/443 |

\* cited by examiner

AUTOMATED DISPENSING MACHINE ADOPTING LOCAL COVERAGE TYPE SUCKER ARRAY AND CONTROL METHOD THEREOF

CROSS-REFERENCE TO RELATED APPLICATIONS

This patent application claims priority to Chinese Patent Application No. 201910615510.2, filed on Jul. 9, 2019, which is hereby incorporated by reference herein as if reproduced in its entirety.

TECHNICAL FIELD

The present disclosure relates to the technical field of automated pharmacies, and in particular to an automated dispensing machine adopting local coverage type sucker array and a control method thereof.

BACKGROUND

An automated dispensing cabinet (ADC) has become the research hotspot in the field of medical supplies to solve the technical problem that the traditional Chinese medicine (TCM) pharmacy dispenses medicines by labors to cause high labor costs and low medicine discharging efficiency. The existing semiautomatic cabinet for storing small-package TCM decoction pieces only can automatically search a medicine according to a prescription, and transfers a box storing the corresponding medicine to a medicine discharging window so as to improve the medicine discharging efficiency to a certain extent. However, the semiautomatic cabinet still needs labors to take out the medicine from a drawer and count the medicine.

SUMMARY OF THE INVENTION

These and other problems are generally solved or circumvented, and technical advantages are generally achieved, by embodiments of the present disclosure which provide an automated dispensing machine adopting local coverage type sucker array and control method thereof.

In view of this, an objective of the present disclosure is to provide an automated dispensing machine adopting local coverage type sucker array and a control method thereof to solve the technical problem that the existing semiautomatic cabinet needs labors to take out medicine packages from medicine storage drawers and counts the medicine packages.

In one embodiment, the automated dispensing machine adopting local coverage type sucker array comprises a rack. A medicine obtaining device and a medicine weighing and discharging device are arranged on the rack.

The medicine obtaining device comprises a guide rail horizontally arranged on the rack, a slide arranged on the guide rail, a first linear driver arranged on the rack to drive the slide to move along the guide rail, a vacuum medicine sucking mechanical arm located below the slide and a second linear driver arranged on the slide to drive the vacuum medicine sucking mechanical arm to move up and down. The vacuum medicine sucking mechanical arm comprises a local coverage type base plate connected with the second linear driver and vacuum suckers arranged on the local coverage type base plate in form of an array. Each vacuum sucker is provided with an air pipe independently connected with an air source, and the air pipe connected with each vacuum sucker is provided with a vacuum generator and a first electromagnetic valve.

The medicine obtaining device is provided with a medicine placing station and at least two medicine obtaining stations along the guide rail. The medicine obtaining device further comprises a position sensor for detecting the route of the first linear driver to each medicine obtaining station. At each medicine obtaining station, the vacuum medicine sucking mechanical arm locally covers an opening surface of a medicine storage box in a direction of the guide rail and fully covers the opening surface of the medicine storage box in a direction vertical to the guide rail.

The medicine weighing and discharging device comprises a weighing sensor arranged on the rack and a medicine receiving groove arranged on the weighing sensor. The medicine receiving groove is located below the medicine placing station on the guide rail. The medicine receiving groove is longitudinally parallel with the guide rail. Two longitudinal ends of the medicine receiving groove are respectively provided with a front medicine discharging opening and a back medicine discharging opening. The front medicine discharging opening is used for discharging a medicine to the medicine storage box. The back medicine discharging opening is used for discharging the medicine out of a cabinet. The medicine weighing and discharging device further comprises a medicine discharging mechanism arranged on the rack and used for discharging the medicine in the medicine receiving groove from the front medicine discharging opening and the back medicine discharging opening.

Further, the medicine discharging mechanism comprises a front nozzle arranged on the rack and blowing from the front medicine discharging opening to the back medicine discharging opening, a back nozzle arranged on the rack and blowing from the back medicine discharging opening to the front medicine discharging opening, a second electromagnetic valve arranged on a connection pipeline between the front nozzle and the air source, and a third electromagnetic valve arranged on a connection pipeline between the back nozzle and the air source.

Further, the medicine obtaining device further comprises a guiding mechanism for guiding the vacuum medicine sucking mechanical arm to move up and down. The guiding mechanism comprises a guide rod, a fixing plate arranged on the slide or the second linear driver, and a linear bearing arranged on the fixing plate and matching with the guide rod. The lower end of the guide rod is fixedly arranged on the local coverage type base plate.

Further, the first linear driver and the second linear driver are air cylinders or electric lead screws.

Further, the first linear driver and the second linear driver are air cylinders. The first linear driver is connected with the air source through an air pipe on which a fourth electromagnetic valve is arranged, and the second linear driver is connected with the air source through an air pipe on which a fifth electromagnetic valve is arranged.

Further, the automated dispensing machine adopting local coverage type sucker array further comprises a controller. The controller comprises a single-chip microprocessor, first relays connected with the first electromagnetic valves, a second relay connected with the second electromagnetic valve, a third relay connected with the third electromagnetic valve, a fourth relay connected with the fourth electromagnetic valve, a fifth relay connected with the fifth electromagnetic valve and a power source module.

The power source module is respectively connected with the single-chip microprocessor, the first relays, the second relay, the third relay, the fourth relay, the fifth relay, the first electromagnetic valves, the second electromagnetic valve, the third electromagnetic valve, the fourth electromagnetic valve and the fifth electromagnetic valve. The first relays, the second relay, the third relay, the fourth relay and the fifth relay are respectively connected with the single-chip microprocessor.

The weighing sensor is connected with the single-chip microprocessor.

The position sensor is connected with the single-chip microprocessor.

The controller further comprises a pressure reducing valve arranged on an air pipe connected with the second linear driver and the air source.

In an embodiment of the present disclosure, a control method of the automated dispensing machine adopting local coverage type sucker array comprises the following seven steps.

Step (1): After the single-chip microprocessor receives medicine grasping and discharging commands, the single-chip microprocessor firstly selects a current medicine obtaining station according to a medicine obtaining station circulation sequence, and then transmits a control signal to the fourth relay such that the fourth relay controls the fourth electromagnetic valve to switch on a forward air path, thereby controlling the first linear driver to push the slide to move forwards to the selected medicine obtaining station.

Step (2): The single-chip microprocessor transmits the control signal to the fifth relay such that the fifth relay controls the fifth electromagnetic valve to switch on the forward air path, thereby controlling the second linear driver to drive the vacuum medicine sucking mechanical arm to move downwards.

Step (3): The single-chip microprocessor transmits the control signal to each first relay such that the first relay controls the first electromagnetic valve to switch on an air path, an air flow enters the vacuum generator, and then the vacuum sucker connected with the vacuum generator generates negative pressure to suck a medicine package.

Step (4): The single-chip microprocessor transmits the control signal to the fifth relay such that the fifth relay controls the fifth electromagnetic valve to switch on a reverse air path, thereby controlling the second linear driver to drive the vacuum medicine sucking mechanical arm to move upwards.

Step (5): The single-chip microprocessor transmits the control signal to the fourth relay such that the fourth relay controls the first electromagnetic valve to switch on the reverse air path, thereby controlling the first linear driver to push the slide back to the medicine placing station.

Step (6): The single-chip microprocessor randomly selects a corresponding number of the first relays according to a difference between a prescription-specified number of the medicine packages and a detection number of the medicine packages of the current weighing sensor, and transmits the control signals to the selected first relays such that the selected first relays control the corresponding first electromagnetic valves to switch off the air paths, and then the corresponding vacuum suckers put down the medicine packages.

Step (7): The single-chip microprocessor acquires detection data of the weighing sensor in real time and compares the acquired detection data with the prescription-specified number of the medicine packages to make the following judgment and control:

when the acquired detection data is equal to the prescription-specified number of the medicine packages, the single-chip microprocessor transmits the control signal to the second relay such that the second relay controls the second electromagnetic valve to switch on the air path, the air flow is ejected from the front nozzle and then medicines in the medicine receiving groove are discharged out of the cabinet; next, the single-chip microprocessor judges whether there is a first electromagnetic valve, the air path of which is not switched off; when there is no such a first electromagnetic valve, the single-chip microprocessor ends the control process; when there is such a first electromagnetic valve, the single-chip microprocessor firstly transmits the control signal to a first relay corresponding to the first electromagnetic valve, the air path of which is not switched off, such that the air path of the first electromagnetic valve is switched off and the corresponding vacuum sucker puts down the medicine package; finally the single-chip microprocessor transmits the control signal to the third relay again such that the third relay controls the third electromagnetic valve to switch on the air path and the air flow is ejected from the back nozzle, thereby blowing the medicine in the medicine receiving groove back to the medicine storage box, and then ending the control process;

when the acquired detection data of the weighing sensor is less than the prescription-specified number of the medicine packages, and there is a first electromagnetic valve, the air path of which is not switched off, the single-chip microprocessor turns to conduct step (6); otherwise, the single-chip microprocessor turns to conduct step (1);

when the acquired detection data of the weighing sensor is greater than the prescription-specified number of the medicine packages, the single-chip microprocessor firstly transmits the control signal to the third relay such that the third relay controls the third electromagnetic valve to switch on the air path, and the air flow is ejected from the back nozzle, thereby blowing the medicine in the medicine receiving groove back to the medicine storage box; next, the prescription-specified number of the medicine packages is compared with the number of the first electromagnetic valves, the air paths of which are not switched off; when the prescription-specified number of the medicine packages is less than the number of the first electromagnetic valves, the air paths of which are not switched off, the single-chip microprocessor turns to conduct step (6); otherwise, the single-chip microprocessor turns to conduct step (1).

Embodiments of the present disclosure have the following beneficial effects. The automated dispensing machine adopting local coverage type sucker array and the control method thereof may automatically take the medicine packages out of the medicine storage boxes of the cabinet and discharge the medicine packages, which are accurately weighed and have the same prescription-specified number, out of the cabinet so as to obtain the medicine packages instead of labors, further improve the degree of automation of the cabinet, improve the medicine discharging efficiency and reduce the labor costs.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

Figure 1:
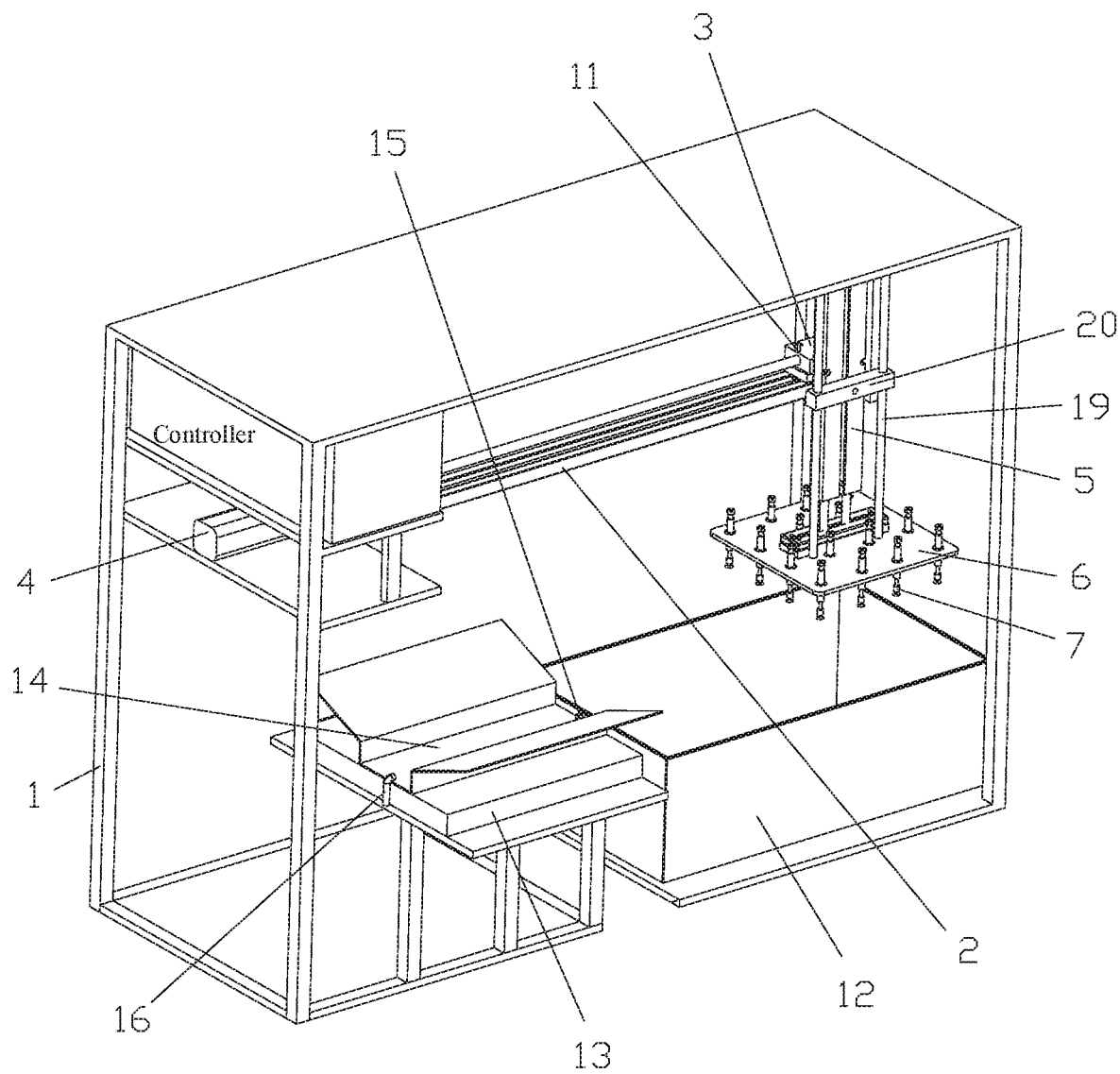
FIG. 1 is a schematic diagram showing a stereo structure of an automated dispensing machine adopting local coverage type sucker array in an embodiment of the present disclosure.
Figure 2:
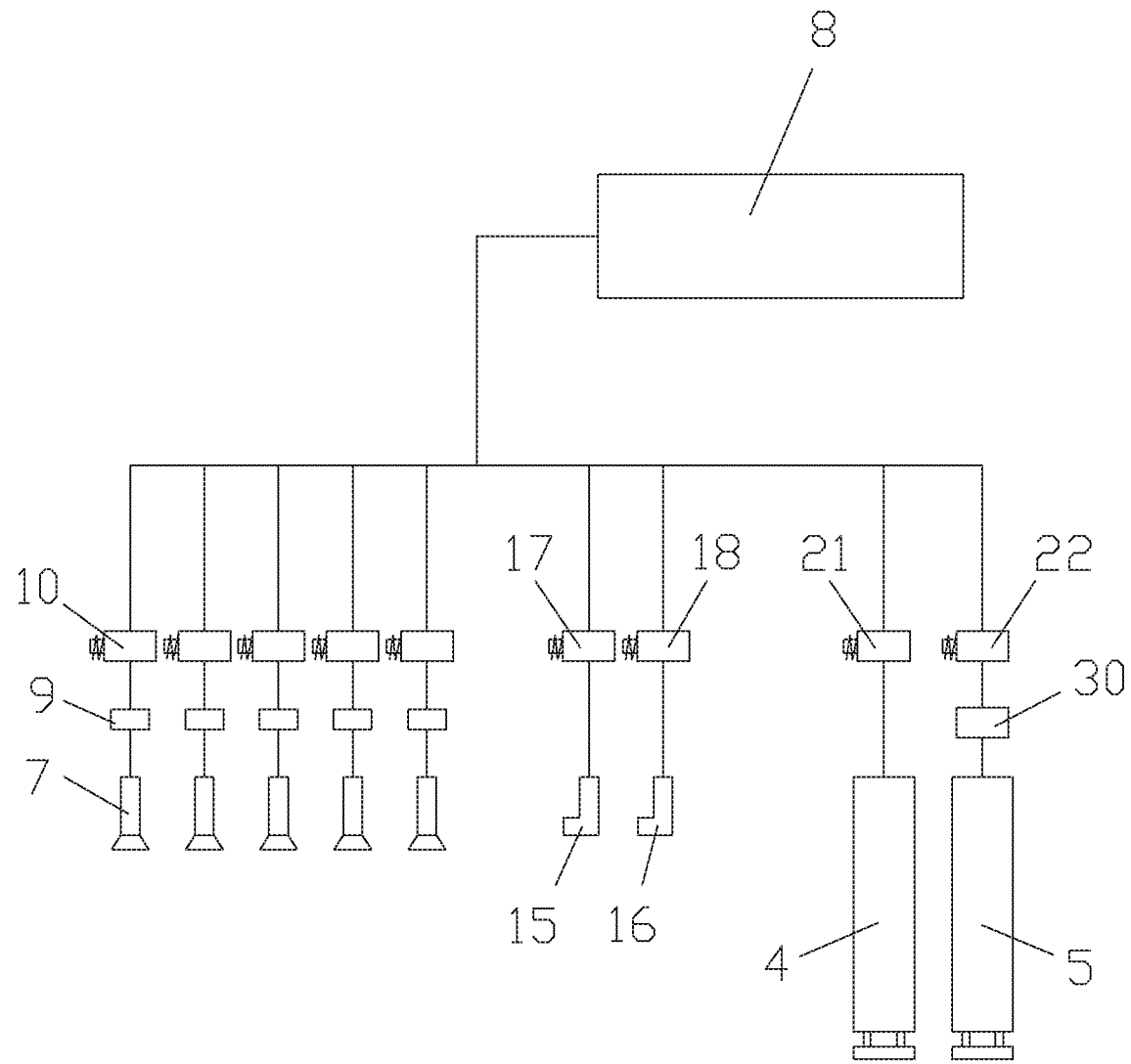
FIG. 2 is a schematic diagram showing air path connection of an automated dispensing machine adopting local coverage type sucker array in an embodiment of the present disclosure.
Figure 3:
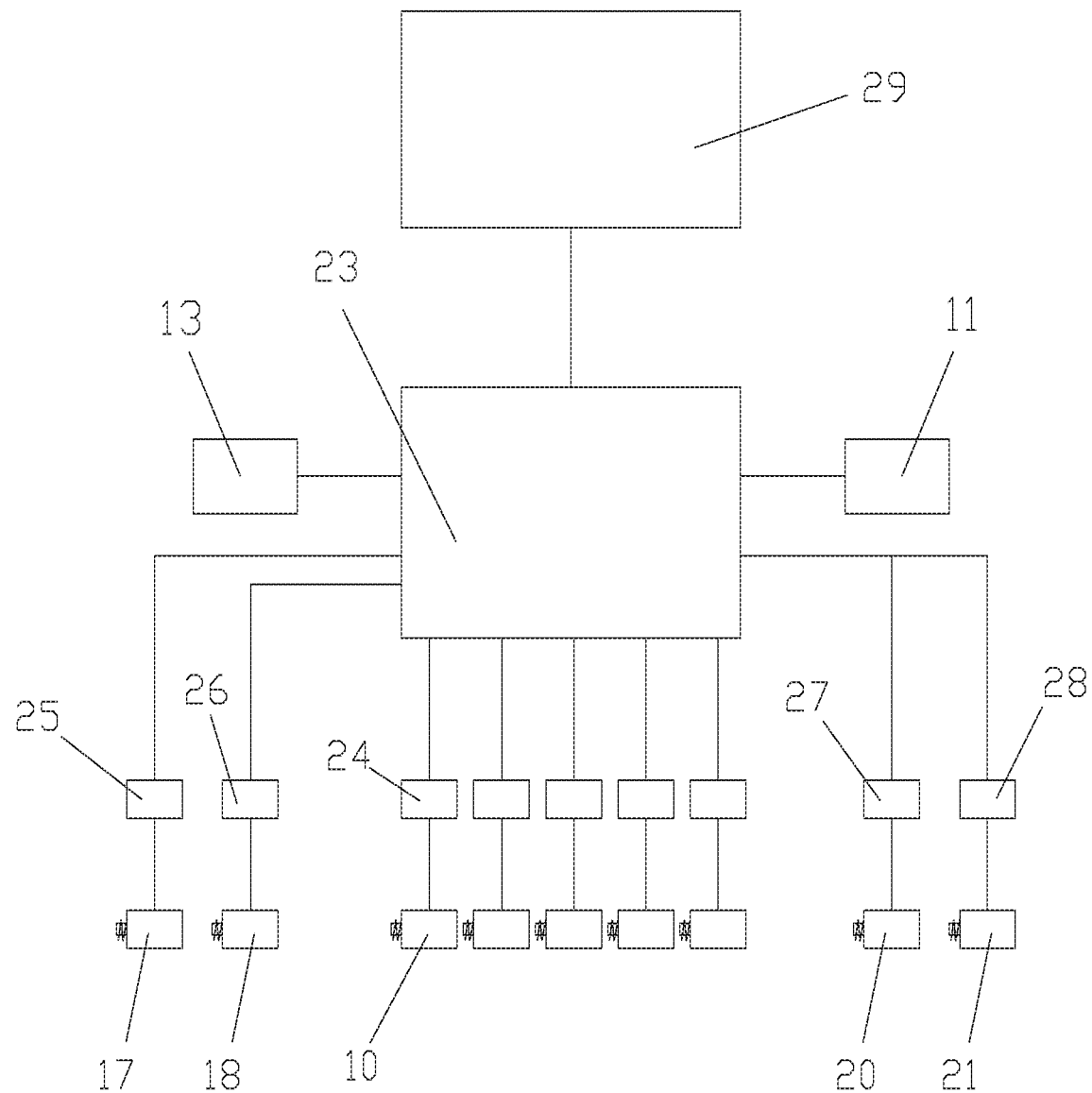
FIG. 3 is a schematic diagram showing a connection structure of a control device according to an embodiment of the present disclosure.

The making and using of the embodiments of this disclosure are discussed in detail below. It should be appreciated, however, that the concepts disclosed herein can be embodied in a wide variety of specific contexts. The specific embodiments discussed are merely illustrative, and do not limit the scope of the claims.

The following further describes the present disclosure with reference to the accompanying drawings and embodiments.

As shown in the drawings, an automated dispensing machine adopting local coverage type sucker array in an embodiment comprises a rack 1. A medicine obtaining device and a medicine weighing and discharging device are arranged on the rack.

The medicine obtaining device comprises a guide rail 2 horizontally arranged on the rack, a slide 3 arranged on the guide rail, a first linear driver 4 arranged on the rack to drive the slide to move along the guide rail, a vacuum medicine sucking mechanical arm located below the slide and a second linear driver 5 arranged on the slide to drive the vacuum medicine sucking mechanical arm to move up and down. The vacuum medicine sucking mechanical arm comprises a local coverage type base plate 6 connected with the second linear driver and vacuum suckers 7 arranged on the local coverage type base plate in form of an array. Each vacuum sucker is provided with an air pipe independently connected with an air source 8, and the air pipe connected with each vacuum sucker is provided with a vacuum generator 9 and a first electromagnetic valve 10.

The medicine obtaining device is provided with a medicine placing station and two medicine obtaining stations along the guide rail. Certainly, the medicine obtaining stations can be set to other numbers in different embodiments. The medicine obtaining device further comprises a position sensor ii for detecting the route of the first linear driver to each medicine obtaining station. In a specific embodiment, the position sensor ii for detecting the route may be an ultrasonic sensor, a laser sensor, a displacement sensor, a collision switch, a magnetic sensor and the like. At each medicine obtaining station, the vacuum medicine sucking mechanical arm locally covers an opening surface of a medicine storage box 12 in a direction of the guide rail and fully covers the opening surface of the medicine storage box in a direction vertical to the guide rail.

The medicine weighing and discharging device comprises a weighing sensor 13 arranged on the rack and a medicine receiving groove 14 arranged on the weighing sensor. The medicine receiving groove is located below the medicine placing station on the guide rail. The medicine receiving groove is longitudinally parallel with the guide rail. Two longitudinal ends of the medicine receiving groove are respectively provided with a front medicine discharging opening and a back medicine discharging opening. The front medicine discharging opening is used for discharging a medicine to the medicine storage box. The back medicine discharging opening is used for discharging the medicine out of a cabinet. The medicine weighing and discharging device further comprises a medicine discharging mechanism arranged on the rack and used for discharging the medicine in the medicine receiving groove from the front medicine discharging opening and the back medicine discharging opening.

The medicine receiving groove 14 is formed by a U-shaped groove bottom and medicine receiving slant plates arranged at the opening of the U-shaped groove bottom in a truncated V shape. The medicine receiving slant plates receive medicine packages, and through the medicine receiving slant plates, the medicine packages slide to the U-shaped groove bottom. The U-shaped groove bottom is small such that the medicine packages can be centralized to discharge. Certainly, in different embodiments, the medicine receiving groove may be designed to be other flared grooves.

In the embodiment, the medicine discharging mechanism comprises a front nozzle 15 arranged on the rack and blowing from the front medicine discharging opening to the back medicine discharging opening, a back nozzle 16 arranged on the rack and blowing from the back medicine discharging opening to the front medicine discharging opening, a second electromagnetic valve 17 arranged on a connection pipeline between the front nozzle and the air source, and a third electromagnetic valve 18 arranged on a connection pipeline between the back nozzle and the air source. Certainly, in different embodiments, the medicine discharging mechanism can be further in other forms.

In the embodiment, the medicine obtaining device further comprises a guiding mechanism for guiding the vacuum medicine sucking mechanical arm to move up and down. The guiding mechanism comprises a guide rod 19, a fixing plate 20 arranged on the second linear driver, and a linear bearing arranged on the fixing plate and matching with the guide rod. The lower end of the guide rod is fixedly arranged on the local coverage type base plate. The guiding mechanism can greatly ensure that the vacuum medicine sucking mechanical arm does not deflect and shake during up-and-down movement such that the vacuum medicine sucking mechanical arm can accurately enter the medicine storage box to grasp the medicine.

In the embodiment, the first linear driver and the second linear driver are air cylinders. Certainly, in different embodiments, they may be electric lead screws.

In the embodiment, the first linear driver is connected with the air source through an air pipe on which a fourth electromagnetic valve 21 is arranged, and the second linear driver is connected with the air source through an air pipe on which a fifth electromagnetic valve 22 is arranged.

In the embodiment, the automated dispensing machine adopting local coverage type sucker array further comprises a controller. The controller comprises a single-chip microprocessor 23, first relays 24 connected with the first electromagnetic valves, a second relay 25 connected with the second electromagnetic valve, a third relay 26 connected with the third electromagnetic valve, a fourth relay 27 connected with the fourth electromagnetic valve, a fifth relay 28 connected with the fifth electromagnetic valve and a power source module 29.

The power source module is respectively connected with the single-chip microprocessor, the first relays, the second relay, the third relay, the fourth relay, the fifth relay, the first electromagnetic valves, the second electromagnetic valve, the third electromagnetic valve, the fourth electromagnetic valve and the fifth electromagnetic valve. The first relays, the second relay, the third relay, the fourth relay and the fifth relay are respectively connected with the single-chip microprocessor.

The weighing sensor is connected with the single-chip microprocessor.

The position sensor is connected with the single-chip microprocessor.

The controller further comprises a pressure reducing valve 30 arranged on an air pipe connected with the second linear driver and the air source. The pressure reducing valve is used for controlling a route that the second linear driver moves downwards. When the second linear driver drives the vacuum medicine sucking mechanical arm to move downwards, the internal air pressure of the pipeline connected with the second linear driver and the air source is increased after the vacuum suckers come into contact with the medicine package, and the pressure reducing valve exhausts and releases the pressure when the internal air pressure is increased to be over a preset pressure of the pressure reducing valve so as to maintain the internal air pressure at the preset pressure. Therefore, it can ensure that openings of the vacuum suckers and the medicine package form excellent seal fit under a certain contact pressure; the success rate of grasping the medicine is improved; problems that the route of the second linear driver is so long as to cause damage to the device and the route is insufficient to cause a medicine grasping failure can be avoided.

In the embodiment, a control method of the automated dispensing machine adopting local coverage type sucker array comprises the following seven steps.

Step (1): After the single-chip microprocessor receives medicine grasping and discharging commands, the single-chip microprocessor firstly selects a current medicine obtaining station according to a medicine obtaining station circulation sequence, and then transmits a control signal to the fourth relay such that the fourth relay controls the fourth electromagnetic valve to switch on a forward air path, thereby controlling the first linear driver to push the slide to move forwards to the selected medicine obtaining station; in the present embodiment, there are two medicine obtaining stations, so the medicine obtaining station circulation sequence is as follows: a first medicine obtaining station, a second medicine obtaining station, the first medicine obtaining station; when the first medicine obtaining station is selected to obtain the medicine at this time, the second medicine obtaining station is selected to obtain the medicine next time, and the first medicine obtaining station is selected to obtain the medicine for next time again, over and over again.

Step (2): The single-chip microprocessor transmits the control signal to the fifth relay such that the fifth relay controls the fifth electromagnetic valve to switch on the forward air path, thereby controlling the second linear driver to drive the vacuum medicine sucking mechanical arm to move downwards.

Step (3): The single-chip microprocessor transmits the control signal to each first relay such that the first relay controls the first electromagnetic valve to switch on an air path, an air flow enters the vacuum generator, and then the vacuum sucker connected with the vacuum generator generates negative pressure to suck the medicine package.

Step (4): The single-chip microprocessor transmits the control signal to the fifth relay such that the fifth relay controls the fifth electromagnetic valve to switch on a reverse air path, thereby controlling the second linear driver to drive the vacuum medicine sucking mechanical arm to move upwards.

Step (5): The single-chip microprocessor transmits the control signal to the fourth relay such that the fourth relay controls the first electromagnetic valve to switch on the reverse air path, thereby controlling the first linear driver to push the slide back to the medicine placing station.

Step (6): The single-chip microprocessor randomly selects a corresponding number of the first relays according to a difference between a prescription-specified number of the medicine packages and a detection number of the medicine packages of the current weighing sensor, and transmits the control signals to the selected first relays such that the selected first relays control the corresponding first electromagnetic valves to switch off the air paths, and then the corresponding vacuum suckers put down the medicine packages.

Step (7): The single-chip microprocessor acquires detection data of the weighing sensor in real time and compares the acquired detection data with the prescription-specified number of the medicine packages to make the following judgment and control.

When the acquired detection data is equal to the prescription-specified number of the medicine packages, the single-chip microprocessor transmits the control signal to the second relay such that the second relay controls the second electromagnetic valve to switch on the air path, the air flow is ejected from the front nozzle and then medicines in the medicine receiving groove are discharged out of the cabinet; next, the single-chip microprocessor judges whether there is a first electromagnetic valve, the air path of which is not switched off; when there is no such a first electromagnetic valve, the single-chip microprocessor ends the control process; when there is such a first electromagnetic valve, the single-chip microprocessor firstly transmits the control signal to a first relay corresponding to the first electromagnetic valve, the air path of which is not switched off, such that the air path of the first electromagnetic valve is switched off and the corresponding vacuum sucker puts down the medicine package; finally the single-chip microprocessor transmits the control signal to the third relay again such that the third relay controls the third electromagnetic valve to switch on the air path and the air flow is ejected from the back nozzle, thereby blowing the medicine in the medicine receiving groove back to the medicine storage box, and then ending the control process.

When the acquired detection data of the weighing sensor is less than the prescription-specified number of the medicine packages, and there is a first electromagnetic valve, the air path of which is not switched off, the single-chip microprocessor turns to conduct step (6); otherwise, the single-chip microprocessor turns to conduct step (1).

When the acquired detection data of the weighing sensor is greater than the prescription-specified number of the medicine packages, the single-chip microprocessor firstly transmits the control signal to the third relay such that the third relay controls the third electromagnetic valve to switch on the air path, and the air flow is ejected from the back nozzle, thereby blowing the medicine in the medicine receiving groove back to the medicine storage box; next, the prescription-specified number of the medicine packages is compared with the number of the first electromagnetic valves, the air paths of which are not switched off; when the prescription-specified number of the medicine packages is less than the number of the first electromagnetic valves, the air paths of which are not switched off, the single-chip microprocessor turns to conduct step (6); otherwise, the single-chip microprocessor turns to conduct step (1).

Finally, it should be noted that the foregoing embodiments are merely intended for describing the technical solutions of the present disclosure, but not for limiting the present disclosure. Although the present disclosure is described in detail with reference to the embodiments, persons of ordinary skill in the art should understand that they may still make modifications or equivalent replacements to the technical solutions of the present disclosure without departing from the purpose and the scope of the technical solutions of the present disclosure, and these modifications or equivalent replacements should be covered within the scope of the claims of the present disclosure.

Although embodiments of the present disclosure have been described in detail, it should be understood that various changes, substitutions and alterations can be made herein without departing from the spirit and scope of the disclosure as defined by the appended claims.

Moreover, the scope of the present disclosure is not intended to be limited to the particular embodiments described here. As one of ordinary skill in the art will readily appreciate from the disclosure of the present disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. An automated dispensing machine adopting local coverage type sucker array, comprising a rack, wherein a medicine obtaining device and a medicine weighing and discharging device are arranged on the rack;

wherein the medicine obtaining device comprises a guide rail horizontally arranged on the rack, a slide arranged on the guide rail, a first linear driver arranged on the rack to drive the slide to move along the guide rail, a vacuum medicine sucking mechanical arm located below the slide and a second linear driver arranged on the slide to drive the vacuum medicine sucking mechanical arm to move up and down; the vacuum medicine sucking mechanical arm comprises a local coverage type base plate connected with the second linear driver and vacuum suckers arranged on the local coverage type base plate in form of an array; each vacuum sucker is provided with an air pipe independently connected with an air source, and the air pipe connected with each vacuum sucker is provided with a vacuum generator and a first electromagnetic valve;

wherein the medicine obtaining device is provided with a medicine placing station and at least two medicine obtaining stations along the guide rail; the medicine obtaining device further comprises a position sensor for detecting a route of the first linear driver to each medicine obtaining station; at each medicine obtaining station, the vacuum medicine sucking mechanical arm locally covers an opening surface of a medicine storage box in a direction of the guide rail and fully covers the opening surface of the medicine storage box in a direction vertical to the guide rail; and wherein the medicine weighing and discharging device comprises a weighing sensor arranged on the rack and a medicine receiving groove arranged on the weighing sensor; the medicine receiving groove is located below the medicine placing station on the guide rail; the medicine receiving groove is longitudinally parallel with the guide rail; two longitudinal ends of the medicine receiving groove are respectively provided with a front medicine discharging opening and a back medicine discharging opening; the front medicine discharging opening is used for discharging a medicine to the medicine storage box; the back medicine discharging opening is used for discharging the medicine out of a cabinet; and the medicine weighing and discharging device further comprises a medicine discharging mechanism arranged on the rack and used for discharging the medicine in the medicine receiving groove from the front medicine discharging opening and the back medicine discharging opening.

2. The automated dispensing machine adopting local coverage type sucker array according to claim 1, wherein the medicine discharging mechanism comprises a front nozzle arranged on the rack and blowing from the front medicine discharging opening to the back medicine discharging opening, a back nozzle arranged on the rack and blowing from the back medicine discharging opening to the front medicine discharging opening, a second electromagnetic valve arranged on a connection pipeline between the front nozzle and the air source, and a third electromagnetic valve arranged on a connection pipeline between the back nozzle and the air source.

3. The automated dispensing machine adopting local coverage type sucker array according to claim 1, wherein the medicine obtaining device further comprises a guiding mechanism for guiding the vacuum medicine sucking mechanical arm to move up and down; the guiding mechanism comprises a guide rod, a fixing plate arranged on the slide or the second linear driver, and a linear bearing arranged on the fixing plate and matching with the guide rod; and a lower end of the guide rod is fixedly arranged on the local coverage type base plate.

4. The automated dispensing machine adopting local coverage type sucker array according to claim 3, wherein the first linear driver and the second linear driver are air cylinders or electric lead screws.

5. The automated dispensing machine adopting local coverage type sucker array according to claim 4, wherein the first linear driver and the second linear driver are air cylinders; and the first linear driver is connected with the air source through an air pipe on which a fourth electromagnetic valve is arranged, and the second linear driver is connected with the air source through an air pipe on which a fifth electromagnetic valve is arranged.

6. The automated dispensing machine adopting local coverage type sucker array according to claim 5, further comprising a controller, wherein the controller comprises a single-chip microprocessor, first relays connected with first electromagnetic valves, a second relay connected with second electromagnetic valve, a third relay connected with third electromagnetic valve, a fourth relay connected with fourth electromagnetic valve, a fifth relay connected with fifth electromagnetic valve and a power source module;

wherein the power source module is respectively connected with the single-chip microprocessor, the first relays, the second relay, the third relay, the fourth relay, the fifth relay, the first electromagnetic valves, the second electromagnetic valve, the third electromagnetic valve, the fourth electromagnetic valve and the fifth electromagnetic valve; the first relays, the second relay, the third relay, the fourth relay and the fifth relay are respectively connected with the single-chip microprocessor;

wherein the weighing sensor is connected with the single-chip microprocessor;

wherein the position sensor is connected with the single-chip microprocessor; and wherein the controller further comprises a pressure reducing valve arranged on an air pipe connected with the second linear driver and the air source.

7. The automated dispensing machine adopting local coverage type sucker array according to claim 6, wherein the single-chip microprocessor is further configured to perform following steps:

Step (1), after the single-chip microprocessor receives medicine grasping and discharging commands, the single-chip microprocessor firstly selects a current medicine obtaining station according to a medicine obtaining station circulation sequence, and then transmits a control signal to the fourth relay such that the fourth relay controls the fourth electromagnetic valve to switch on a forward air path, thereby controlling the first linear driver to push the slide to move forwards to the selected current medicine obtaining station;

Step (2), the single-chip microprocessor transmits the control signal to the fifth relay such that the fifth relay controls the fifth electromagnetic valve to switch on the forward air path, thereby controlling the second linear driver to drive the vacuum medicine sucking mechanical arm to move downwards;

Step (3), the single-chip microprocessor transmits the control signal to each first relay such that the first relay controls the first electromagnetic valve to switch on an air path, an air flow enters the vacuum generator, and then a vacuum sucker connected with the vacuum generator generates negative pressure to suck a medicine package;

Step (4), the single-chip microprocessor transmits the control signal to the fifth relay such that the fifth relay controls the fifth electromagnetic valve to switch on a reverse air path, thereby controlling the second linear driver to drive the vacuum medicine sucking mechanical arm to move upwards;

Step (5), the single-chip microprocessor transmits the control signal to the fourth relay such that the fourth relay controls the first electromagnetic valve to switch on the reverse air path, thereby controlling the first linear driver to push the slide back to the medicine placing station;

Step (6), the single-chip microprocessor randomly selects a corresponding number of the first relays according to a difference between a prescription-specified number of the medicine packages and a detection number of the medicine packages of a current weighing sensor, and transmits the control signals to the first relays such that the first relays control the first electromagnetic valves to switch off the air paths, and then the vacuum suckers put down the medicine packages; or Step (7), the single-chip microprocessor acquires detection data of the weighing sensor in real time and compares the acquired detection data with the prescription-specified number of the medicine packages to make the following judgment and control:

when the acquired detection data is equal to the prescription-specified number of the medicine packages, the single-chip microprocessor transmits the control signal to the second relay such that the second relay controls the second electromagnetic valve to switch on the air path, the air flow is ejected from a front nozzle and then medicines in the medicine receiving groove are discharged out of the cabinet; next, the single-chip microprocessor judges whether there is a first electromagnetic valve, the air path of which is not switched off; when the first electromagnetic valve with the air path not switched off does not exist, the single-chip microprocessor ends a control process; when the first electromagnetic valve with the air path not switched off exists, the single-chip microprocessor firstly transmits the control signal to a first relay corresponding to the first electromagnetic valve, the air path of which is not switched off, such that the air path of the first electromagnetic valve is switched off and the vacuum sucker puts down the medicine package; finally the single-chip microprocessor transmits the control signal to the third relay again such that the third relay controls the third electromagnetic valve to switch on the air path and the air flow is ejected from the back nozzle, thereby blowing the medicine in the medicine receiving groove back to the medicine storage box, and then ending the control process;

when the acquired detection data of the weighing sensor is less than the prescription-specified number of the medicine packages, and there is a first electromagnetic valve, the air path of which is not switched off, the single-chip microprocessor turns to conduct step (6); otherwise, the single-chip microprocessor turns to conduct step (1); or when the acquired detection data of the weighing sensor is greater than the prescription-specified number of the medicine packages, the single-chip microprocessor firstly transmits the control signal to the third relay such that the third relay controls the third electromagnetic valve to switch on the air path, and the air flow is ejected from the back nozzle, thereby blowing the medicine in the medicine receiving groove back to the medicine storage box; next, the prescription-specified number of the medicine packages is compared with the number of the first electromagnetic valves, the air paths of which are not switched off; when the prescription-specified number of the medicine packages is less than the number of the first electromagnetic valves, the air paths of which are not switched off, the single-chip microprocessor turns to conduct step (6); and otherwise, the single-chip microprocessor turns to conduct step (1).

8. The automated dispensing machine adopting local coverage type sucker array according to claim 1, wherein the first linear driver and the second linear driver are air cylinders or electric lead screws.

9. The automated dispensing machine adopting local coverage type sucker array according to claim 8, wherein the first linear driver and the second linear driver are air cylinders; and the first linear driver is connected with the air source through an air pipe on which a fourth electromagnetic valve is arranged, and the second linear driver is connected with the air source through an air pipe on which a fifth electromagnetic valve is arranged.

10. The automated dispensing machine adopting local coverage type sucker array according to claim 9, further comprising a controller, wherein the controller comprises a single-chip microprocessor, first relays connected with first electromagnetic valves, a second relay connected with second electromagnetic valve, a third relay connected with third electromagnetic valve, a fourth relay connected with fourth electromagnetic valve, a fifth relay connected with fifth electromagnetic valve and a power source module;

wherein the power source module is respectively connected with the single-chip microprocessor, the first relays, the second relay, the third relay, the fourth relay, the fifth relay, the first electromagnetic valves, the second electromagnetic valve, the third electromagnetic valve, the fourth electromagnetic valve and the fifth electromagnetic valve; the first relays, the second relay, the third relay, the fourth relay and the fifth relay are respectively connected with the single-chip microprocessor;

wherein the weighing sensor is connected with the single-chip microprocessor;

wherein the position sensor is connected with the single-chip microprocessor; and wherein the controller further comprises a pressure reducing valve arranged on an air pipe connected with the second linear driver and the air source.

11. The automated dispensing machine adopting local coverage type sucker array according to claim 10, wherein the single-chip microprocessor is further configured to perform following steps:

(1), after the single-chip microprocessor receives medicine grasping and discharging commands, the single-chip microprocessor firstly selects a current medicine obtaining station according to a medicine obtaining station circulation sequence, and then transmits a control signal to the fourth relay such that the fourth relay controls the fourth electromagnetic valve to switch on a forward air path, thereby controlling the first linear driver to push the slide to move forwards to the selected current medicine obtaining station;

(2), the single-chip microprocessor transmits the control signal to the fifth relay such that the fifth relay controls the fifth electromagnetic valve to switch on the forward air path, thereby controlling the second linear driver to drive the vacuum medicine sucking mechanical arm to move downwards;

(3), the single-chip microprocessor transmits the control signal to each first relay such that the first relay controls the first electromagnetic valve to switch on an air path, an air flow enters the vacuum generator, and then a vacuum sucker connected with the vacuum generator generates negative pressure to suck a medicine package;

(4), the single-chip microprocessor transmits the control signal to the fifth relay such that the fifth relay controls the fifth electromagnetic valve to switch on a reverse air path, thereby controlling the second linear driver to drive the vacuum medicine sucking mechanical arm to move upwards;

(5), the single-chip microprocessor transmits the control signal to the fourth relay such that the fourth relay controls the first electromagnetic valve to switch on the reverse air path, thereby controlling the first linear driver to push the slide back to the medicine placing station;

(6), the single-chip microprocessor randomly selects a corresponding number of the first relays according to a difference between a prescription-specified number of the medicine packages and a detection number of the medicine packages of a current weighing sensor, and transmits the control signals to the first relays such that the first relays control the first electromagnetic valves to switch off the air paths, and then the vacuum suckers put down the medicine packages; or (7), the single-chip microprocessor acquires detection data of the weighing sensor in real time and compares the acquired detection data with the prescription-specified number of the medicine packages to make following judgment and control:

when the acquired detection data is equal to the prescription-specified number of the medicine packages, the single-chip microprocessor transmits the control signal to the second relay such that the second relay controls the second electromagnetic valve to switch on the air path, the air flow is ejected from a front nozzle and then medicines in the medicine receiving groove are discharged out of the cabinet; next, the single-chip microprocessor judges whether there is a first electromagnetic valve, the air path of which is not switched off; when the first electromagnetic valve with the air path not switched off does not exist, the single-chip microprocessor ends a control process; when the first electromagnetic valve with the air path not switched off exists, the single-chip microprocessor firstly transmits the control signal to a first relay corresponding to the first electromagnetic valve, the air path of which is not switched off, such that the air path of the first electromagnetic valve is switched off and the vacuum sucker puts down the medicine package; finally the single-chip microprocessor transmits the control signal to the third relay again such that the third relay controls the third electromagnetic valve to switch on the air path and the air flow is ejected from the back nozzle, thereby blowing the medicine in the medicine receiving groove back to the medicine storage box, and then ending the control process;

when the acquired detection data of the weighing sensor is less than the prescription-specified number of the medicine packages, and there is a first electromagnetic valve, the air path of which is not switched off, the single-chip microprocessor turns to conduct step (6); otherwise, the single-chip microprocessor turns to conduct step (1); or when the acquired detection data of the weighing sensor is greater than the prescription-specified number of the medicine packages, the single-chip microprocessor firstly transmits the control signal to the third relay such that the third relay controls the third electromagnetic valve to switch on the air path, and the air flow is ejected from the back nozzle, thereby blowing the medicine in the medicine receiving groove back to the medicine storage box; next, the prescription-specified number of the medicine packages is compared with the number of the first electromagnetic valves, the air paths of which are not switched off; when the prescription-specified number of the medicine packages is less than the number of the first electromagnetic valves, the air paths of which are not switched off, the single-chip microprocessor turns to conduct step (6); and otherwise, the single-chip microprocessor turns to conduct step (1).

\* \* \* \* \*

UNITED STATES PATENT AND TRADEMARK OFFICE
CERTIFICATE OF CORRECTION

PATENT NO. : 10,889,008 B1
APPLICATION NO. : 16/837855
DATED : January 12, 2021
INVENTOR(S) : Yongduan Song Page 1 of 1

It is certified that error appears in the above-identified patent and that said Letters Patent is hereby corrected as shown below:

In the Claims

In Column 12, Line 38, Claim 7, delete "from the back" and insert --from a back--.

In Column 14, Line 48, Claim 11, delete "from the back" and insert --from a back--.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*